(12) United States Patent
Rusert et al.

(10) Patent No.: US 10,123,039 B2
(45) Date of Patent: Nov. 6, 2018

(54) CONSTRUCTING INTER-LAYER REFERENCE PICTURE LISTS

(71) Applicant: Telefonaktiebolaget L M Ericsson (publ), Stockholm (SE)

(72) Inventors: Thomas Rusert, Stockholm (SE); Andrey Norkin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 178 days.

(21) Appl. No.: 14/782,992

(22) PCT Filed: Apr. 4, 2014

(86) PCT No.: PCT/SE2014/050421
§ 371 (c)(1),
(2) Date: Oct. 7, 2015

(87) PCT Pub. No.: WO2014/168561
PCT Pub. Date: Oct. 16, 2014

(65) Prior Publication Data
US 2016/0323598 A1 Nov. 3, 2016

Related U.S. Application Data

(60) Provisional application No. 61/811,376, filed on Apr. 12, 2013.

(51) Int. Cl.
*H04N 7/12* (2006.01)
*H04N 19/573* (2014.01)
(Continued)

(52) U.S. Cl.
CPC ......... *H04N 19/573* (2014.11); *H04N 19/105* (2014.11); *H04N 19/172* (2014.11);
(Continued)

(58) Field of Classification Search
CPC .. H04N 19/573; H04N 19/105; H04N 19/172; H04N 19/30–19/31; H04N 19/33; H04N 19/597; H04N 19/70; H04N 19/58
See application file for complete search history.

(56) References Cited

U.S. PATENT DOCUMENTS 7,671,894 B2 * 3/2010 Yea ..................... H04N 7/181
348/218.1
9,319,657 B2 * 4/2016 Kang ................. H04N 13/0048
(Continued)

FOREIGN PATENT DOCUMENTS

CN 1761322 A 4/2006
CN 101040533 A 9/2007

OTHER PUBLICATIONS

Chen, Jianle et al., "SHVC Draft Text 1", Joint Collaborative Team on Video Coding (JCT-VC) of ITU-T SG16 WP3 and ISO/IEC JTC1/SC29/WG11, Document JCTVC-L1008, 12th Meeting, Geneva, Switzerland, Jan. 14-23, 2013, 1-34.
(Continued)

*Primary Examiner* — Nhon T Diep
(74) *Attorney, Agent, or Firm* — Murphy, Bilak & Homiller, PLLC (57) ABSTRACT

A method (200) of constructing at least one list of reference pictures for inter-layer prediction of a current picture is provided. The method comprises inserting (210) reference pictures into a first set of reference pictures or a second set of reference pictures, based on respective values of a scalability identifier associated with the reference pictures and a value of the scalability identifier associated with the current picture, and inserting (220) the first set of reference pictures and the second set of reference pictures into the at least one list of reference pictures. By taking indications for similarities between reference layers and the current layer into account, a more efficient multi-layer video compression is
(Continued)

achieved. Further, a corresponding computer program, a corresponding computer program product, and a corresponding device are provided.

27 Claims, 2 Drawing Sheets

(51) Int. Cl.
| | |
|---|---|
| *H04N 19/597* | (2014.01) |
| *H04N 19/105* | (2014.01) |
| *H04N 19/70* | (2014.01) |
| *H04N 19/172* | (2014.01) |
| *H04N 19/30* | (2014.01) |
| *H04N 19/33* | (2014.01) |
| *H04N 19/31* | (2014.01) |
| *H04N 19/58* | (2014.01) |

(52) U.S. Cl.
CPC ............ *H04N 19/30* (2014.11); *H04N 19/31* (2014.11); *H04N 19/33* (2014.11); *H04N 19/597* (2014.11); *H04N 19/70* (2014.11); *H04N 19/58* (2014.11)

(56) References Cited

U.S. PATENT DOCUMENTS

| | | | | |
|---|---|---|---|---|
| 9,635,357 | B2* | 4/2017 | Zhang | H04N 19/51 |
| 9,930,363 | B2* | 3/2018 | Rusanovskyy | H04N 19/597 |
| 9,992,493 | B2* | 6/2018 | Chen | H04N 19/105 |
| 2007/0086521 | A1* | 4/2007 | Wang | H04N 21/23406 375/240.1 |
| 2009/0290643 | A1* | 11/2009 | Yang | H04N 19/597 375/240.16 |
| 2010/0111183 | A1 | 5/2010 | Jeon et al. | |
| 2010/0195912 | A1 | 8/2010 | Nakada et al. | |
| 2010/0266042 | A1* | 10/2010 | Koo | H04N 19/597 375/240.16 |
| 2012/0057635 | A1* | 3/2012 | Rusert | H04N 21/234309 375/240.16 |
| 2013/0077677 | A1 | 3/2013 | Wang et al. | |
| 2013/0089134 | A1 | 4/2013 | Wang et al. | |
| 2013/0287108 | A1* | 10/2013 | Chen | H04N 19/597 375/240.16 |
| 2014/0016701 | A1* | 1/2014 | Chen | H04N 19/105 375/240.14 |
| 2014/0049604 | A1* | 2/2014 | Chen | H04N 19/597 348/43 |
| 2014/0218473 | A1* | 8/2014 | Hannuksela | H04N 19/597 348/43 |
| 2014/0301463 | A1* | 10/2014 | Rusanovskyy | H04N 19/52 375/240.14 |
| 2015/0296222 | A1* | 10/2015 | Llin | H04N 19/597 375/240.16 |

OTHER PUBLICATIONS

Qian, Richard J., "Content-Scalable Shape Representation and Coding", IEEE, International Conference on Image Processing, Oct. 26, 1997, 819-822.

Sjöberg, Rickard et al., "Overview of HEVC High-Level Syntax and Reference Picture Management", Transactions on Circuits and Systems for Video Technology, vol. 22, No. 12, Dec. 2012, 1858-1870.

Sullivan, Gary J. et al., "Overview of the High Efficiency Video Coding (HEVC) Standard", IEEE Transactions on Circuits and Systems for Video Technology, vol. 22, No. 12, Dec. 2012,1649-1668.

Tech, Gerhard et al., "MV-HEVC Draft Text 3", Joint Collaborative Team on 3D Video Coding Extension Development of ITU-T SG 16 WP 3 and ISO/IEC JTC 1/SC 29/WG 11, Document JCT3V-C1004_d3, 3rd Meeting, Geneva, Switzerland, Jan. 17-23, 2013, 1-34.

Wahadaniah, Viktor et al., "AHG21: Construction and modification of predefined reference picture sets and reference picture lists", Joint Collaborative Team on Video Coding (JCT-VC) of ITU-T SG16 WP3 and ISO/IEC JTC1/SC29/WG11, Document JCTVC-G548,, Nov. 21-30, 2011, 1-21.

\* cited by examiner

CONSTRUCTING INTER-LAYER REFERENCE PICTURE LISTS

TECHNICAL FIELD

The invention relates to a method of constructing at least one list of reference pictures for inter-layer prediction of a current picture, a device for constructing at least one list of reference pictures for inter-layer prediction of a current picture, a corresponding computer program, and a corresponding computer program product.

BACKGROUND

The High Efficiency Video Coding (HEVC) core standard has recently been finalized by the International Telecommunication Union (ITU) (ITU-T Rec. H.265) and the Moving Picture Experts Group (MPEG) (ISO/IEC 23008-2/MPEG-H Part 2). Layered extensions to the HEVC standard are under development, e.g., the Multi-View extension (MV-HEVC), the 3D extension (3D-HEVC), and the Scalable extension (SHVC). Further extensions, or combinations of existing extensions, may be specified in the future.

HEVC and its extensions make extensive use of predictive coding tools. From the decoder perspective, pixel data is reconstructed using previously decoded pixel data for prediction. In particular, for inter-picture prediction, previously decoded pictures, so-called reference pictures, are used for prediction in the reconstruction process of a current picture.

According to the HEVC specification, each picture is subdivided into one or multiple slices, and each slice can contain multiple blocks (more specifically, block-shaped coding units and prediction units). The pictures which are available as prediction references for decoding a current slice are placed into so-called reference picture lists. According to the HEVC specification, different types of slices exist. For "P slices", at most one reference picture can be used for prediction of a current block. Accordingly, P slices have one reference picture list, called "list0". For "B slices", at most two reference pictures can be used for prediction of a current block, which is also referred to as "bi-prediction". Accordingly, B slices have two reference picture lists, referred to as "list0" and "list1".

The reference picture used for reconstructing a particular block can be signaled by means of so-called reference picture indexes. A reference picture index is an index into a reference picture list, such as list0 or list1. The reference picture indexes are coded along with other data in the HEVC bit stream as part of coded slice data. The length of a code word used to send a reference picture index depends on the index value itself, in particular if Variable Length Coding (VLC) is used. Typically, small reference picture indexes require shorter code words. Thus, the further in front of a reference picture list a certain reference picture is placed, the fewer bits are required to indicate its use. Accordingly, in order to achieve high compression efficiency, a typical strategy is to place reference pictures which are frequently used for prediction at the front of a reference picture list.

Typically, the reference picture lists are constructed in a two-step process, (1) initial reference picture list construction followed by (2) reference picture list modification. Step 1 is pre-defined through the decoder specification and results in an initial reference picture list. Step 2 involves signaling reference picture list modification commands in slice headers and results in the final reference picture list by applying the reference picture list modification commands on the initial reference picture list. Since sending reference picture list modification commands requires transmission of additional bits, it is desirable that the initial reference picture list is carefully designed, so that frequently used reference pictures can be indicated with few bits, yielding high compression efficiency.

While the HEVC core specification only uses temporally neighboring pictures for inter-picture prediction, i.e., pictures within the same temporal layer, it is likely that multi-layer HEVC extensions, such as scalable and 3D extensions, will use pictures from other layers, e.g., scalability layers and/or view layers, as reference pictures. The current draft SHVC, MV-H EVC, and 3D-H EVC, specifications are using ad-hoc methods for reference picture list construction. Thus, in order to improve bit efficiency, there is a need for more efficient methods for reference picture list construction for multi-layer HEVC extensions using reference pictures across layers.

In the draft SHVC (JCTVC-L1008) and MV-HEVC specifications (JCT3V-C1004), a layer identifies, i.e., is associated with, a set of pictures corresponding to, e.g., a spatial resolution or quality (for SHVC), to a camera view (for MV-HEVC), or to a depth view (for 3D-HEVC). Each layer has an index i and is identified by a layer identifier layer_id (see syntax element layer_id_in_nuh[i] below). The layer index i is typically an indicator for the decoding order. Thus, for each access unit (i.e., sampling time or moment in time), up to one picture for each layer (view, picture resolution, etc.) is decoded in the order of the layer index i.

Further, a set of scalability identifiers are associated with each layer (see syntax element dimension_id[i][j] below). Examples for scalability identifiers are "ViewId" (identifying a certain camera view), "DepthFlag" (identifying whether a layer carries depth data or not), "DependencyId" (indicating decoding dependencies in case of, e.g., spatial scalability), "QualityId" (indicating a video quality), and others.

In SHVC and MV-H EVC, parameters related to high-level video representations are signaled in extensions of the so-called Video Parameter Set (VPS). The VPS extension syntax, and some relevant semantics, is depicted below. Specifically, layer dependencies are signaled using the syntax element "direct_dependency_flag", based on which the variable arrays RefLayerId[i][j] and NumDirectRefLayers[i] are derived for each layer i, as is described below.

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| for( i = 0, NumScalabilityTypes = 0; i < 16; i++ ) { | |
| scalability_mask[ i ] | u(1) |
| NumScalabilityTypes += scalability_mask[ i ] | |
| } | |
| for( j = 0; j <NumScalabilityTypes; j++ ) | |
| dimension_id_len_minus1[ j ] | u(3) |
| vps_nuh_layer_id_present_flag | u(1) |
| for( i = 1; i <= vps_max_layers_minus1; i++ ) { | |
| if( vps_nuh_layer_id_present_flag ) | |
| layer_id_in_nuh[ i ] | u(6) |
| for( j = 0; j < NumScalabilityTypes; j++ ) | |
| dimension_id[ i ][ j ] | u(v) |
| } | |
| for(lsIdx = 1;lsIdx <= vps_num_layer_sets_minus1;lsIdx ++) | |
| { | |
| vps_profile_present_flag[ lsIdx ] | u(1) |

-continued

```
vps_extension( ) {                                              Descriptor
    if( !vps_profile_present_flag[ lsIdx ] )
        profile_layer_set_ref_minus1[ lsIdx ]                   ue(v)
    profile_tier_level( vps_profile_present_flag[ lsIdx ],
vps_max_sub_layers_minus1)
    }
    num_output_layer_sets                                       ue(v)
    for( i = 0; i < num_output_layer_sets; i++ ) {
        output_layer_set_idx[ i ]                               ue(v)
        lsIdx = output_layer_set_idx[ i ]
        for( j = 0 ; j <= vps_max_layer_id; j++)
            if( layer_id_included_flag[ lsIdx ][ j ] )
                output_layer_flag[ lsIdx ][ j ]                 u(1)
    }
    for( i = 1; i <= vps_max_layers_minus1; i++ )
        for( j = 0; j < i; j++ )
            direct_dependency_flag[ i ][ j ]                    u(1)
}
``` layer_id_in_nuh[i] specifies the value of the nuh_layer_id syntax element in Video Coding Layer (VCL) Network Abstraction Layer (NAL) units of the i-th layer. For i in a range from 0 to vps_max_layers_minus1, inclusive, when not present, the value of layer_id_in_nuh[i] is inferred to be equal to i. When i is greater than 0, layer_id_in_nuh[i] shall be greater than layer_id_in_nuh[i−1]. For i in a range from 0 to vps_max_layers_minus1, inclusive, the variable LayerIdInVps[layer_id_in_nuh[i]] is set equal to i.

dimension_id[i][j] specifies the identifier of the j-th present scalability dimension type of the i-th layer. When not present, the value of dimension_id[i][j] is inferred to be equal to 0. The number of bits used for the representation of dimension_id[i][j] is dimension_id_len_minus1[j]+1. When splitting flag is equal to 1, it is a requirement of bitstream conformance that dimension_id[i][j] shall be equal to ((layer_id_in_nuh[i] & ((1<<dimBitOffset[j+1])−1))>>dimBitOffset[j]).

The variable ScalabilityId[i][smIdx] specifying the identifier of the smIdx-th scalability dimension type of the i-th layer and the variable ViewId[layer_id_in_nuh[i]] specifying the view identifier of the i-th layer are derived as follows:

```
for (i = 0; i <= vps_max_layers_minus1; i++) {
    for( smIdx= 0, j =0; smIdx< 16; smIdx ++ )
        if( ( i != 0 ) && scalability_mask[ smIdx ] )
            ScalabilityId[ i ][ smIdx ] = dimension_id[ i ][ j++ ]
        else
            ScalabilityId[ i ][ smIdx ] = 0
    ViewId[ layer_id_in_nuh[ i ] ] = ScalabilityId[ i ][ 0 ]
}
``` direct_dependency_flag[i][j] equal to 0 specifies that the layer with index j is not a direct reference layer for the layer with index i. direct_dependency_flag[i][j] equal to 1 specifies that the layer with index j may be a direct reference layer for the layer with index i. When direct_dependency_flag[i][j] is not present for i and j in the range of 0 to vps_max_layers_minus1, it is inferred to be equal to 0.

The variables NumDirectRefLayers[i] and RefLayerId[i][j] are derived as follows:

```
for( i = 1; i <= vps_max_layers_minus1; i++ )
    for( j = 0, NumDirectRefLayers[ i ] = 0; j < i; j++ )
        if( direct_dependency_flag[ i ][ j ] = = 1 )
            RefLayerId[ i ][ NumDirectRefLayers[ i ]++ ] =
                layer_id_in_nuh[ j ]
```

Based on RefLayerId[i][j] and NumDirectRefLayers[i], a so-called inter-layer reference picture set is constructed, as is described below.

The output of the decoding process for an inter-layer reference picture set is an updated list of inter-layer pictures RefPicSetInterLayer.

The list RefPicSetInterLayer is first emptied and then derived as follows:

```
for( i =
0; i < NumDirectRefLayers[ LayerIdInVps[ nuh_layer_id ] ]; i++ ) {
    RefPicSetInterLayer[ i ] = the picture with picture order count
        equal to PicOrderCnt and nuh_layer_id equal to
        RefLayerId[ LayerIdInVps[ nuh_layer_id ][ i ] ]
    RefPicSetInterLayer[ i ] is marked as "used for long-term reference"
}
```

The output of the marking process for ending the decoding of a coded picture with nuh_layer_id greater than zero is a potentially updated marking as "used for short-term reference" for some decoded pictures.

The following applies:

```
for( i =
0; i < NumDirectRefLayers[ LayerIdInVps[ nuh_layer_id ] ]; i++ )
    RefPicSetInterLayer[ i ] is marked as "used for short-term reference"
```

Temporal reference pictures and inter-layer reference pictures are combined into two temporary reference picture lists, RefPicListTemp0 and RefPicListTemp1, as is described below. Finally, potential reference picture list modification commands are applied and the final reference picture lists RefPicList0 and RefPicList1 are obtained, as is described below.

The decoding process for reference picture lists construction is invoked at the beginning of the decoding process for each P or B slice.

Reference pictures are addressed through reference indices as specified in sub-clause 8.5.3.3.2 of the HEVC base spec (JCTVC-L1003). A reference index is an index into a reference picture list. When decoding a P slice, there is a single reference picture list RefPicList0. When decoding a B slice, there is a second independent reference picture list RefPicList1 in addition to RefPicList0.

At the beginning of the decoding process for each slice, the reference picture lists RefPicList0 and, for B slices, RefPicList1 are derived as follows.

The variable NumRpsCurrTempList0 is set equal to Max (num_ref_idx_l0_active_minus1+1, NumPocTotalCurr) and the list RefPicListTemp0 is constructed as follows:

```
rIdx = 0
while( rIdx < NumRpsCurrTempList0 ) {
    for(i = 0; i < NumPocStCurrBefore && rIdx
        < NumRpsCurrTempList0;
        rIdx++, i++ )
        RefPicListTemp0[ rIdx ] = RefPicSetStCurrBefore[ i ]
    for( i = 0; i < NumPocStCurrAfter && rIdx
        < NumRpsCurrTempList0;
        rIdx++, i++ )
        RefPicListTemp0[ rIdx ] = RefPicSetStCurrAfter[ i ]
    for( i = 0; i < NumPocLtCurr && rIdx < NumRpsCurrTempList0;
```

-continued

```
        rIdx++, i++ )
        RefPicListTemp0[ rIdx ] = RefPicSetLtCurr[ i ]
    for( i =
    0; i < NumDirectRefLayers[ LayerIdInVps[ nuh_layer_id ] ];
        rIdx++, i++)
        RefPicListTemp0[ rIdx ] = RefPicSetInterLayer[ i ]
}
```

The list RefPicList0 is constructed as follows:

```
for( rIdx = 0; rIdx <= num_ref_idx_l0_active_minus1; rIdx++)
    RefPicList0[ rIdx ] = ref_pic_list_modification_flag_l0 ?
        RefPicListTemp0[ list_entry_l0[ rIdx ] ] :
        RefPicListTemp0[ rIdx ]
```

When the slice is a B slice, the variable NumRpsCurrTempList1 is set equal to Max(num_ref_idx_l1_active_minus1+1, NumPocTotalCurr) and the list RefPicListTemp1 is constructed as follows:

```
rIdx = 0
while( rIdx < NumRpsCurrTempList1 ) {
    for( i = 0; i < NumPocStCurrAfter && rIdx <
    NumRpsCurrTempList1;
        rIdx++, i++ )
        RefPicListTemp1[ rIdx ] = RefPicSetStCurrAfter[ i ]
    for( i = 0; i < NumPocStCurrBefore && rIdx <
    NumRpsCurrTempList1;
        rIdx++, i++ )
        RefPicListTemp1[ rIdx ] = RefPicSetStCurrBefore[ i ]
    for( i = 0; i < NumPocLtCurr && rIdx < NumRpsCurrTempList1;
        rIdx++, i++ )
        RefPicListTemp1[ rIdx ] = RefPicSetLtCurr[ i ]
    for( i = 0; i< NumDirectRefLayers[ LayerIdInVps[ nuh_layer_id ]
    ] ;
        rIdx++, i++)
        RefPicListTemp1[ rIdx ] = RefPicSetInterLayer[ i ]
}
```

When the slice is a B slice, the list RefPicList1 is constructed as follows:

```
for( rIdx = 0; rIdx <= num_ref_idx_l1_active_minus1; rIdx++)
    RefPicList1[ rIdx ] = ref_pic_list_modification_flag_l1 ?
        RefPicListTemp1[ list_entry_l1[ rIdx ] ] : RefPicListTemp1[
        rIdx ]
```

In the reference picture list initialization procedure summarized hereinbefore, inter-layer reference pictures are appended to the reference picture list according to the order of reference layers in the ordered array RefPicSetInterLayer[ ]. The order of reference layers in RefPicSetInterLayer[ ] is fixed according to the layer index i of the reference layers, from small to large values of i. Thus, the inter-layer reference pictures in both initial reference picture lists are always inserted with increasing order of the layer index i. This order does not take into account potential similarities or dissimilarities of different layers, and is thus not optimal in terms of compression efficiency, or bitrate efficiency.

SUMMARY

It is an object of the invention to provide an improved alternative to the above techniques and prior art.

More specifically, it is an object of the invention to provide an improved construction of inter-layer reference picture lists, and in particular initial reference picture lists.

These and other objects of the invention are achieved by means of different aspects of the invention, as defined by the independent claims. Embodiments of the invention are characterized by the dependent claims.

According to a first aspect of the invention, a method of constructing at least one list of reference pictures for inter-layer prediction of a current picture is provided. The method comprises inserting reference pictures into a first set of reference pictures or a second set of reference pictures. The reference pictures are inserted based on respective values of a scalability identifier associated with the reference pictures and a value of the scalability identifier associated with the current picture. The method further comprises inserting the first set of reference pictures and the second set of reference pictures into the at least one list of reference pictures.

According to a second aspect of the invention, a computer program is provided. The computer program comprises computer-executable instructions for causing a device to perform the method according to the first aspect of the invention when the computer-executable instructions are executed on a processing unit comprised in the device.

According to a third aspect of the invention, a computer program product is provided. The computer program product comprises a computer-readable storage medium. The computer-readable storage medium has the computer program according to the second aspect of the invention embodied therein.

According to a fourth aspect of the invention, a device for constructing at least one list of reference pictures for inter-layer prediction of a current picture is provided. The device comprises means configured for inserting reference pictures into a first set of reference pictures or a second set of reference pictures. The means are configured for inserting the reference pictures based on respective values of a scalability identifier associated with the reference pictures and a value of the scalability identifier associated with the current picture. The means are further configured for inserting the first set of reference pictures and the second set of reference pictures into the at least one list of reference pictures.

The invention makes use of an understanding that the construction of reference picture lists can be improved by taking indications for similarities between reference layers and the current layer into account. Thereby, a more efficient multi-layer video compression is achieved. Such indications for similarities are provided by the scalability identifiers. To this end, the inter-layer reference pictures are inserted according to their respective values of their scalability identifiers when constructing initial reference picture lists.

The construction of reference picture lists proposed herein may be performed using a pre-defined process, e.g., sorting of reference pictures according to scalability identifiers, both at a video encoder and a video decoder. Alternatively, reference picture lists may be constructed at the video encoder and then signaled to the video decoder, e.g., additional information, meta data, by means of reference picture list modification commands or similar, and then applied at the video decoder.

According to an embodiment of the invention, the reference pictures are inserted into the first set of reference pictures or the second set of reference pictures based on a difference of their respective value of the scalability identifier and the value of the scalability identifier associated with the current picture.

According to an embodiment of the invention, reference pictures having respective values of the scalability identifier which are smaller than the value of the scalability identifier associated with the current picture are inserted into the first set of reference pictures, and reference pictures having respective values of the scalability identifier which are greater than the value of the scalability identifier associated with the current picture are inserted into the second set of reference pictures.

According to an embodiment of the invention, the reference pictures comprised in the first set of reference pictures and the second set of reference pictures are ordered according to their respective values of the scalability identifier.

According to an embodiment of the invention, the reference pictures are ordered in decreasing value of the scalability identifier.

According to an embodiment of the invention, the reference pictures are ordered in increasing value of the scalability identifier.

According to an embodiment of the invention, the reference pictures are ordered in decreasing absolute difference of their respective values of the scalability identifier and the value of the scalability identifier associated with the current picture.

According to an embodiment of the invention, the reference picture are ordered in increasing absolute difference of their respective values of the scalability identifier and the value of the scalability identifier associated with the current picture.

According to an embodiment of the invention, two lists of reference pictures are constructed, the first set of reference pictures is inserted into the first list of reference pictures in front of the second set of reference pictures, and the second set of reference pictures is inserted into the second list of reference pictures in front of the first set of reference pictures.

According to an embodiment of the invention, the first set of reference pictures is inserted into the first list of reference pictures after a first set of short-term reference pictures and before a second set of short-term reference pictures, and at the end of the second list of reference pictures. Further, the second set of reference pictures is inserted into the second list of reference pictures after the second set of short-term reference pictures and before the first set of short-term reference pictures, and at the end of the first list of reference pictures.

According to an embodiment of the invention, the reference pictures are inserted into the first set of reference pictures and the second set of reference pictures based on their respective values of at least two scalability identifiers, a first and a second scalability identifier, associated with the reference pictures and respective values of the scalability identifiers associated with the current picture.

According to an embodiment of the invention, each of the scalability identifiers is any one of a view identifier indicating a relative spatial camera capture position, a dependency identifier indicating a decoding order, a quality identifier indicating a layer decoding order, a temporal identifier indicating temporal scalability information, or a depth flag indicating whether a layer contains texture or depth information.

According to an embodiment of the invention, the method is comprised in a method of encoding a video.

According to an embodiment of the invention, the method is comprised in a method of decoding a video.

According to an embodiment of the invention, the device is a video encoder.

According to another embodiment of the invention, the device is a video decoder.

According to an embodiment of the invention, the device is comprised in a mobile terminal.

Even though advantages of the invention have in some cases been described with reference to embodiments of a certain aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

For the purpose of clarity, for each embodiment the differences with respect to syntax and semantics of the current draft specifications, as described in the Background section, are identified in the following.

Reference Picture List Construction Based on ViewId

This embodiment relates to cases where the current layer and the reference layers differ in their respective values of ViewId. The proposed mechanism comprises two steps:

Step 1: Derivation of Two Lists of Reference Pictures, RefPicSetInterLayerBefore and RefPicSetInterLayerAfter.

Each inter-view reference picture given in the list RefLayerId[ ] is inserted either into RefPicSetInterLayerBefore or RefPicSetInterLayerAfter, depending on its value of ViewId, ViewId_ref, and the value of ViewId of the current picture, ViewId_curr. If ViewId_ref<ViewId_curr, it is inserted into RefPicSetInterLayerBefore. Otherwise, it is inserted into RefPicSetInterLayerAfter.

Figure 1:
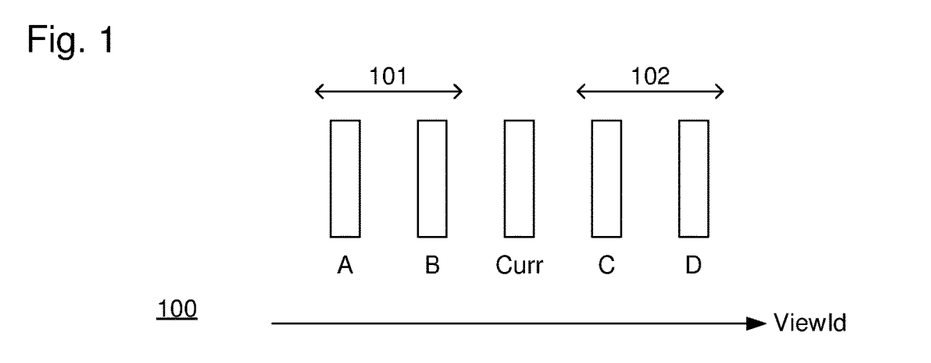
FIG. 1 illustrates reference picture set construction in accordance with an embodiment of the invention.

This is illustrated 100 in FIG. 1, which shows five pictures, a current picture (Curr) and four reference pictures (A, B, C, and D) with respective values of ViewId which are increasing from left to right in FIG. 1. In accordance with an embodiment of the invention, reference pictures A and B, in FIG. 1 illustrated to have respective ViewIds smaller than the ViewId of the current picture Curr, are inserted into a first set 101. Accordingly, reference pictures C and D, in FIG. 1 illustrated to have respective ViewIds greater than the ViewId of the current picture Curr, are inserted into a second set 102.

Optionally, the pictures in RefPicSetInterLayerBefore (e.g., set 101) are sorted by decreasing value of their ViewId, i.e., the order of the reference pictures in RefPicSetInterLayerBefore is such that the absolute difference abs(ViewId_ref−ViewId_curr) is increasing. Further, the pictures in RefPicSetInterLayerAfter (e.g., list 102) are sorted by increasing value of their ViewId, i.e., the order of the reference pictures in RefPicSetInterLayerAfter is such that the absolute difference abs(ViewId_ref−ViewId_curr) is increasing.

Step 2: Insertion of Inter-View Reference Pictures into the Reference Picture Lists RefPicListTemp0 and RefPicListTemp1.

RefPicListTemp0 and RefPicListTemp1 are the reference picture lists before applying reference picture list modification commands. For RefPicListTemp0, the pictures from RefPicSetInterLayerBefore are inserted according to their order in RefPicSetInterLayerBefore. Afterwards, pictures from RefPicSetInterLayerAfter are inserted according to their order in RefPicSetInterLayerAfter. For RefPicListTemp1, the pictures from RefPicSetInterLayerAfter are inserted according to their order in RefPicSetInterLayerAfter. Afterwards, pictures from RefPicSetInterLayerBefore are inserted according to their order in RefPicSetInterLayerBefore.

The output of the decoding process for inter-layer reference picture sets is two updated lists of inter-layer pictures, RefPicSetInterLayerBefore and RefPicSetInterLayerAfter, as well as the variables NumInterLayerBefore and NumInterLayerAfter.

The lists RefPicSetInterLayerBefore and RefPicSetInterLayerBefore are first emptied and then derived as follows:

```
for( i = 0, NumInterLayerBefore = 0, NumInterLayerAfter = 0; i <
    NumDirectRefLayers[LayerIdInVps[ nuh_layer_id ] ]; i++ )
    if( ViewId[ RefLayerId[ LayerIdInVps[ nuh_layer_id ] ][ i ] ] <
        ViewId[ nuh_layer_id ] ) {
        for( j = NumInterLayerBefore; j > 0 &&
            ViewId[ RefLayerId[ LayerIdInVps[ nuh_layer_id ] ]
            [ i ] ] > ViewId[ the value of nuh_layer_id of
            RefPicSetLayerBefore[ j − 1 ] ]; j−− )
            RefPicSetInterLayerBefore[ j ] =
                RefPicSetInterLayerBefore[ j − 1 ]
        RefPicSetInterLayerBefore[ j ] = the picture with picture order
            count equal to PicOrderCnt and nuh_layer_id equal to
            RefLayerId[ LayerIdInVps[ nuh_layer_id ] ] [ i ]
        NumInterLayerBefore++
        RefPicSetInterBefore[ j ] is marked as "used for long-term
            reference"
    } else {
        for( j = NumInterLayerAfter; j > 0 && ViewId[ RefLayerId[
            LayerIdInVps[ nuh_layer_id ] ][ i ] ] <
            ViewId[ the value of nuh_layer_id of
            RefPicSetLayerAfter[ j − 1 ] ]; j−− )
            RefPicSetInterLayerAfter[ j ] =
                RefPicSetInterLayerAfter[ j − 1 ]
        RefPicSetInterLayerAfter[ j ] = the picture with picture order
            count equal to PicOrderCnt and nuh_layer_id equal to
            RefLayerId[ LayerIdInVps[ nuh_layer_id ] ] [ i ]
        NumInterLayerAfter++
        RefPicSetInterAfter[ j ] is marked as "used for long-term
            reference"
    }
```

The output of the marking process for ending the decoding of a coded picture with nuh_layer_id greater than 0 is a potentially updated marking as "used for short-term reference" for some decoded pictures. The following applies:

```
for( i = 0; i < NumInterLayerBefore; i++ )
    RefPicSetInterLayerBefore[ i ] is marked as "used for short-term
        reference"
for( i = 0; i < NumInterLayerAfter; i++ )
    RefPicSetInterLayerAfter[ i ] is marked as "used for short-term
        reference"
```

The decoding process for reference picture lists construction is invoked at the beginning of the decoding process for each P or B slice.

At the beginning of the decoding process for each slice, the reference picture list RefPicList0, and for B slices RefPicList1, are derived as follows.

The variable NumRpsCurrTempList0 is set equal to Max (num_ref_idx_l0_active_minus1+1, NumPocTotalCurr) and the list RefPicListTemp0 is constructed as follows:

```
rIdx = 0
while( rIdx < NumRpsCurrTempList0 ) {
    for( i = 0; i < NumPocStCurrBefore && rIdx <
        NumRpsCurrTempList0;
        rIdx++, i++ )
        RefPicListTemp0[ rIdx ] = RefPicSetStCurrBefore[ i ]
    for( i = 0; i < NumPocStCurrAfter && rIdx <
        NumRpsCurrTempList0;
        rIdx++, i++ )
        RefPicListTemp0[ rIdx ] = RefPicSetStCurrAfter[ i ]
    for( i = 0; i < NumPocLtCurr && rIdx < NumRpsCurrTempList0;
        rIdx++, i++ )
        RefPicListTemp0[ rIdx ] = RefPicSetLtCurr[ i ]
    for( i = 0; i < NumInterLayerBefore; rIdx++, i++ )
        RefPicListTemp0[ rIdx ] = RefPicSetInterLayerBefore[ i ]
    for( i = 0; i < NumInterLayerAfter; rIdx++, i++ )
        RefPicListTemp0[ rIdx ] = RefPicSetInterLayerAfter[ i ]
}
```

The list RefPicList0 is constructed as follows:

```
for( rIdx = 0; rIdx <= num_ref_idx_l0_active_minus1; rIdx++)
    RefPicList0[ rIdx ] = ref_pic_list_modification_flag_l0 ?
        RefPicListTemp0[ list_entry_l0[ rIdx ] ] : RefPicListTemp0[
        rIdx ]
```

When the slice is a B slice, the variable NumRpsCurrTempList1 is set equal to Max (num_ref_idx_l1_active_minus1+1, NumPocTotalCurr) and the list RefPicListTemp1 is constructed as follows:

```
rIdx = 0
while( rIdx < NumRpsCurrTempList1 ) {
    for( i = 0; i < NumPocStCurrAfter && rIdx <
        NumRpsCurrTempList1;
        rIdx++, i++ )
        RefPicListTemp1[ rIdx ] = RefPicSetStCurrAfter[ i ]
```

```
      for( i = 0; i < NumPocStCurrBefore && rIdx <
      NumRpsCurrTempList1;
          rIdx++, i++ )
          RefPicListTemp1[ rIdx ] = RefPicSetStCurrBefore[ i ]
      for( i = 0; i < NumPocLtCurr && rIdx < NumRpsCurrTempList1;
          rIdx++, i++ )
          RefPicListTemp1[ rIdx ] = RefPicSetLtCurr[ i ]
      for( i = 0; i < NumInterLaterAfter; rIdx++, i++ )
          RefPicListTemp1[ rIdx ] = RefPicSetInterLayerAfter[ i ]
      for( i = 0; i < NumInterLaterBefore; rIdx++, i++ )
          RefPicListTemp1[ rIdx ] = RefPicSetInterLayerBefore[ i ]
}
```

When the slice is a B slice, the list RefPicList1 is constructed as follows:

```
for( rIdx = 0; rIdx <= num_ref_idx_l1_active_minus1; rIdx++)
    RefPicList1[ rIdx ] = ref_pic_list_modification_flag_l1 ?
        RefPicListTemp1[ list_entry_l1[ rIdx ] ] : RefPicListTemp1[
        rIdx ]
```

According to the current VPS extension syntax referred to in the Background section, the ViewId is signaled only for layers with layer index greater than 0. The base layer (layer index 0) always has all scalability dimensions equal to 0, i.e., ViewId is inferred to be equal to 0. Also, for layer index greater than 0, the value of ViewId is always non-negative.

According to the proposed process described above, ViewId is interpreted as a spatial camera location associated with a view. If the base view has ViewId equal to 0, then it would be restricted to be the "leftmost" or "rightmost" view only. In order to overcome this restriction, a more flexible signaling may be introduced, and several alternatives are described in the following.

Alternative A: Sending Dimension_Id for Layer Index Equal to 0

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| for( i = 0, NumScalabilityTypes = 0; i < 16; i++ ) { | |
| scalability_mask[ i ] | u(1) |
| NumScalabilityTypes += scalability_mask[ i ] | |
| } | |
| for( j = 0; j <NumScalabilityTypes; j++ ) | |
| dimension_id_len_minus1[ j ] | u(3) |
| vps_nuh_layer_id_present_flag | u(1) |
| for( i = 0; i <= vps_max_layers_minus1; i++ ) { | |
| if( vps_nuh_layer_id_present_flag && i > 0 ) | |
| layer_id_in_nuh[ i ] | u(6) |
| for( j = 0; j < NumScalabilityTypes; j++ ) | |
| dimension_id[ i ][ j ] | u(v) |
| } | |
| ... | |

Alternative B: Alternative A with Optional Presence of Dimension_Id for the Base Layer The syntax elements dimension_id could be present for the base layer, optionally gated by a flag. There could be one flag indicating the presence of dimension_id for the base layer for all scalability types.

Alternatively, for each scalability type there could be a separate flag indicating whether dimension_id for the base layer is present for that scalability type.

Alternative C: Interpreting ViewId as a Signed Integer

In this case, ViewId for the base layer is still derived to be equal to 0. However, ViewId for higher layers is derived such that one bit of its value is interpreted as a sign, e.g., the least significant bit or the most significant bit, and the remaining bits are interpreted as a magnitude (minus 1). This is illustrated in the following pseudo-code, where the least significant bit is interpreted as sign.

The variable ScalabilityId[i][smIdx], specifying the identifier of the smIdx-th scalability dimension type of the i-th layer, and the variable ViewId[layer_id_in_nuh[i]], specifying the view identifier of the i-th layer, are derived as follows:

```
for (i = 0; i <= vps_max_layers_minus1; i++) {
    for( smIdx= 0, j =0; smIdx< 16; smIdx ++ )
        if( ( i != 0 ) && scalability_mask[ smIdx ] )
            ScalabilityId[ i ][ smIdx ] = dimension_id[ i ][ j++ ]
        else
            ScalabilityId[ i ][ smIdx ] = 0
    ViewId[ layer_id_in_nuh[ i ] ] = (i == 0) ? 0 :
        (ScalabilityId[ i ][ 0 ] & 1 ? −1 : 1)*((ScalabilityId[ i ][ 0 ]
        >> 1)+1)
}
```

Reference Picture List Construction Based on DependencyId

This embodiment relates to cases where the current layer and the reference layers differ in their respective values of DependencyId. The proposed mechanism comprises two steps.

Step 1: Derivation of the List RefPicSetInterLayer.

Each inter-layer reference picture given in the list RefLayerId[ ] is inserted into RefPicSetInterLayer. The pictures in RefPicSetInterLayer are sorted by decreasing value of their respective DependencyId. Thus, with DependencyId_ref being the value of the DependencyId of the reference picture, and DependencyId_curr being the value of the DependencyId of the current picture, the order of the reference pictures in RefPicSetInterLayer is such that the absolute difference abs(DependencyId_ref−DependencyId_curr) is increasing.

Step 2: Insertion of Inter-View Reference Pictures into the Reference Picture Lists RefPicListTemp0 and RefPicListTemp1.

Step 2 is not changed as compared to the draft specification referred to in the Background section.

The output of the decoding process for inter-layer reference picture sets is an updated list of inter-layer pictures, RefPicSetInterLayer. The list RefPicSetInterLayer is first emptied and then derived as follows:

```
for( i = 0; i < NumDirectRefLayers[ LayerIdInVps[ nuh_layer_id ] ]; i++
)
    for( j = i; j > 0 && DependencyId[ RefLayerId[
        LayerIdInVps[ nuh_layer_id ] ][ i ] ] >
        DependencyId [ the value of nuh_layer_id of
        RefPicSetLayer[ j − 1 ] ]; j−− )
        RefPicSetInterLayer [ j ] = RefPicSetInterLayer [ j − 1 ]
    RefPicSetInterLayer [ j ] = the picture with picture order count equal
        to PicOrderCnt and nuh_layer_id equal to
        RefLayerId[LayerIdInVps[ nuh_layer_id ] ][ i ]
    RefPicSetInterLayer[ j ] is marked as "used for long-term reference"
```

Otherwise, the derivation is done in the same way as described in the Background section.

Reference Picture List Construction Based on a Combination of DependencyId and QualityId This embodiment relates to cases where the current layer and the reference layers differ in their respective values of DependencyId, and additionally may differ in their respective values of QualityId. The proposed solution comprises two steps.

Step 1: Derivation of the List RefPicSetInterLayer.

Each inter-layer reference picture given in the list RefLayerId[ ] is inserted into RefPicSetInterLayer. The pictures in RefPicSetInterLayer are primarily sorted by decreasing value of their DependencyId, and secondarily sorted by decreasing value of their QualityId. That is, pictures are sorted by DependencyId, and if DependencyId is identical for some pictures in the list, then those pictures are sorted by decreasing value of QualityId.

Step 2: Insertion of Inter-View Reference Pictures into the Reference Picture Lists RefPicListTemp0 and RefPicListTemp1.

Step 2 is not changed as compared to the draft specification referred to in the Background section.

Reference Picture List Construction Based on a Combination of DependencyId and ViewId This embodiment relates to cases where the current layer and the reference layers differ in their respective values of DependencyId and/or ViewId. Other scalability identifiers may be combined in similar ways. The proposed solution comprises two steps.

Step 1: Derivation of the Lists RefPicSetInterDependency, RefPicSetInterViewBefore, RefPicSetInterViewAfter and RefPicSetInterDependencyView Each inter-layer reference picture given in the list RefLayerId[ ] is inserted either into RefPicSetInterDependency, RefPicSetInterViewBefore, RefPicSetInterViewAfter, or RefPicSetInterDependencyView.

Reference pictures which differ from the current picture in their respective value of DependencyId, but do not differ in their respective value of ViewId, are inserted into RefPicSetInterDependency.

Reference pictures which differ from the current picture in their respective value of ViewId, but do not differ in their respective value of DependencyId, are inserted into RefPicSetInterViewBefore or RefPicSetInterViewAfter, depending on their value of ViewId compared to ViewId of the current picture, similar to what is described hereinbefore.

Reference pictures which differ from the current picture both in their respective values of ViewId and DependencyId are inserted into RefPicSetInterDependencyView. These pictures may alternatively be split into two lists, depending on their value of ViewId compared to ViewId of the current picture, similar to what is described hereinbefore.

The pictures in RefPicSetInterDependency are sorted by decreasing value of their DependencyId, similar to what is described hereinbefore.

The pictures in RefPicSetInterViewBefore are sorted by decreasing value of their ViewId, similar to what is described hereinbefore.

The pictures in RefPicSetInterViewAfter are sorted by increasing value of their ViewId, similar to what is described hereinbefore.

The pictures in RefPicSetInterDependencyView are sorted by a combination of their values of DependencyId and ViewId, DependencyId_ref and ViewId_ref, compared to the values of DependencyId and ViewId of the current picture, DependencyId_curr and ViewId_curr. For instance, the before mentioned combination of values may be a sum of absolute differences (abs(ViewId_ref−ViewId_curr)+abs(DependencyId_ref−DependencyId_curr)), or sum of squared differences (ViewId_ref−ViewId_curr)$^2$+(DependencyId_ref−DependencyId_curr)$^2$, or similar combinations.

Step 2: Insertion of Inter-View Reference Pictures into the Reference Picture Lists RefPicListTemp0 and RefPicListTemp1.

RefPicSetInterDependency, RefPicSetInterViewBefore, RefPicSetInterViewAfter and RefPicSetInterDependencyView are inserted separately into the reference picture lists, e.g., in the order RefPicSetInterViewBefore, RefPicSetInterViewAfter, RefPicSetInterDependency, RefPicSetInterDependencyView.

Reference Picture List Construction Based on a Combination of DependencyId and POC or ViewId and POC This embodiment relates to cases where the current layer and the reference layers differ in their respective values of DependencyId, and may additionally differ in their respective value of Picture Order Count (POC). Similarly, the layers may differ in the respective values of, e.g., ViewId, or some other scalability identifier, and may additionally differ in their value of POC. This is, e.g., the case where inter-layer prediction is used but not restricted to inter-layer prediction from the same POC or access unit. That is, prediction from pictures in other layers which are not temporally aligned with the current picture can be used. Since the prediction in this case is both across layers (inter-layer prediction) and across time (temporal prediction), i.e., spanning two dimensions rather than one, it is sometimes referred to as "diagonal" prediction.

In order to implement diagonal prediction in a video coding scheme, an indication and/or agreement between encoder and decoder is required as to which temporal instances, i.e., a set of values of POC, from the reference layer are used for prediction. In the following, several alternatives are proposed.

For each reference layer, a list of POC values or POC differences, i.e., differences between the POC of a reference picture and the POC of the current picture, for reference pictures to be used from the reference layer is indicated, e.g., in a Sequence Parameter Set (SPS) or a slice header, and coded in the bitstream. The decoder can then use the indicated values for constructing the reference picture list.

Alternatively, a number N of reference pictures, indicated by POC values, to be used for prediction from the reference layer is indicated, e.g., in an SPS or slice header, and coded in the bitstream. Based on the number, the decoder identifies the list of POC values or POC differences, with respect to the POC of the current picture, to be used for prediction, and uses the values for constructing the reference picture list.

The identification of a list of POC values or POC differences may, e.g., include adding the N previously decoded pictures into the reference picture list. The identification of a list of POC values or POC differences may alternatively include using the same POC values or POC differences as being used for temporal prediction in the reference view or base view. Further, a subset of the values may be used, e.g., the N first POC values or POC differences which are used for temporal prediction in the reference view or base view.

The proposed solution comprises two steps.

Step 1: Derivation of the List RefPicSetInterLayer.

Reference pictures are inserted into RefPicSetInterLayer and sorted by a combination of their values of DependencyId and POC, DependencyId_ref and POC_ref, compared to the values of DependencyId and POC of the current picture, DependencyId_curr and POC_curr. The abovementioned combination of values may be a sum of absolute differences (abs(POC_ref−POC_curr)+abs(DependencyId_ref−DependencyId_curr)), a sum of squared differences (ViewId_ref−ViewId_curr)$^2$+(DependencyId_ref−DependencyId_curr)$^2$, or similar combinations.

Alternatively, the pictures in RefPicSetInterLayer may be primarily sorted by increasing abs(POC_ref−POC_curr) and secondarily by increasing abs(DependencyId_ref−DependencyId_curr), or primarily by increasing abs(DependencyId_ref−DependencyId_curr) and secondarily by increasing abs(POC_ref−POC_curr). Here, primarily sorting a list by "X" and secondarily sorting by "Y" means that the list is sorted by "X", and if pictures have the same value of "X", these pictures are sorted by "Y".

Alternatively, the pictures may be divided into three lists, RefPicSetInterLayerPOCBefore, RefPicSetInterLayerPOCCurr, and RefPicSetInterLayerPOCAfter, so that RefPicSetInterLayerPOCBefore contains pictures that have a POC less than the POC of the current picture, RefPicSetInterLayerPOCCurr contains pictures that have a POC identical to the POC of the current picture, and RefPicSetInterLayerPOCAfter contains pictures that have a POC greater than the POC of the current picture. Each of the three lists may be sorted by increasing difference of POC compared to the POC of the reference pictures.

Step 2: Insertion of Inter-View Reference Pictures into the Reference Picture Lists RefPicListTemp0 and RefPicListTemp1.

RefPicSetInterLayer is inserted into the reference picture lists.

RefPicSetInterLayerPOCBefore, RefPicSetInterLayerPOCCurr, and

RefPicSetInterLayerPOCAfter, are inserted into the reference picture lists, e.g., in the order RefPicSetInterLayerPOCBefore, RefPicSetInterLayerPOCCurr, RefPicSetInterLayerPOCAfter for RefPicListTemp0, and in the order RefPicSetInterLayerPOCAfter, RefPicSetInterLayerPOCCurr, RefPicSetInterLayerPOCBefore for RefPicListTemp1.

Encoder-Side Reference Picture List Construction

In this embodiment the encoder computes a reference picture list order according to one of the previous embodiments and sends the resulting order, e.g., as reference picture lists, explicitly to the decoder. The signaling may be done according to reference picture list modification commands. However, reference picture list modification commands can be bit inefficient since they are sent in the slice header and since they may have to be sent for all reference pictures, not only the inter-view reference pictures.

Thus, an alternative signaling may be used, e.g., in a Sequence Parameter Set (SPS) or a Picture Parameter Set (PPS), as is outlined in the following.

```
num_ref_layers_l0 (coded as ue(v))
num_ref_layers_l1 (coded as ue(v))
if( num_ref_layers_l0 > 0 || num_ref_layers_l1 > 0 ) {
    log2_max_num_ref_layers (coded as ue(v))
    if( log2_max_num_ref_layers > 0 ) {
        for( i=0; i < num_ref_layers_l0; i++ )
            ref_layer_idx_l0[j] (coded as u(v) with
                v=log2_max_num_ref_layers, or v = 6)
```

-continued

```
        for( i=0; i < num_ref_layers_l1; i++ )
            ref_layer_idx_l1[j] (coded as u(v) with
                v=log2_max_num_ref_layers, or v = 6)
    }
}
```

Here ref_layer_idx_l0 and ref_layer_idx_l1 may specify indexes into a list of reference layers RefLayers[ ] as specified in the Background section. Alternatively:

```
max_num_ref_layers (coded as ue(v))
if( max_num_ref_layers > 0 ) {
    num_ref_layers_l0_minus1 (coded as ue(v))
    num_ref_layers_l1_minus1 (coded as ue(v))
    if( max_num_ref_layers > 1 ) {
        for( i=0; i <= num_ref_layers_l0_minus1; i++ )
            ref_layer_idx_l0[j] (coded as u(v) with
                v=log2_max_num_ref_layers, or v = 6)
        for( i=0; i <= num_ref_layers_l1_minus1; i++ )
            ref_layer_idx_l1[j] (coded as u(v) with
                v=log2_max_num_ref_layers, or v = 6)
    }
}
```

Here ref_layer_idx_l0 and ref_layer_idx_l1 may specify indexes into a list of reference layers RefLayers[ ] as specified in the Background section.

Reference Picture List Construction Based on the Distance Between the Views

This embodiment relates to cases where the current layer and the reference layers belong to different camera positions. The relative camera positions may be determined from the parameters sent to the decoder, such as the baseline distance or a scale parameter used in the current 3D-H EVC draft standard, which is usually calculated based on the camera baseline parameter. The proposed solution comprises two steps.

Step 1: Derivation of Two Lists RefPicSetInterLayerLeft and RefPicSetInterLayerRight.

Each inter-view reference picture comprised in the list RefLayerId[ ] is inserted either into RefPicSetInterLayerLeft or RefPicSetInterLayerRight, depending on its respective value of the baseline parameter, or a parameter derived from the baseline. If the scale parameter corresponding to the reference picture and the current picture is less than 0, the reference picture is inserted into the list RefPicSetInterLayerLeft, otherwise the reference picture is inserted into the list RefPicSetInterLayerRight. The pictures in RefPicSetInterLayerLeft are sorted by decreasing order of the scale parameter between the current camera (view) and the cameras corresponding to the reference pictures. The pictures in RefPicSetInterLayerRight are sorted in the order of increasing values of the scale parameters between the reference pictures and the current camera position (picture).

Step 2: Insertion of Inter-View Reference Pictures into the Reference Picture Lists RefPicListTemp0 and RefPicListTemp1.

RefPicListTemp0 and RefPicListTemp1 are the reference picture lists before applying reference picture list modification commands. The pictures from RefPicSetInterLayerBefore can be inserted separately from the pictures from RefPiSetInterLayerAfter (i.e., at different positions in the list).

The output of the decoding process for inter-layer reference picture sets is two updated lists of inter-layer pictures, RefPicSetInterLayerLeft and RefPicSetInterLayerRight, as well as the variables NumInterLayerLeft and NumInterLayerRight.

The lists RefPicSetInterLayerLeft and RefPicSetInterLayerRight are first emptied and then derived as follows:

```
for( i = 0, NumInterLayerLeft = 0, NumInterLayerRight = 0; i <
    NumDirectRefLayers[ LayerIdInVps[ nuh_layer_id ] ]; i++ )
    if(scale (ViewId[ [ LayerIdInVps[ nuh_layer_id ] ][ i ] ] ,
        ViewId[ nuh_layer_id ] ]) < 0) {
        for( j = NumInterLayerLeft; j > 0 && scale [ ViewId[
            RefLayerId[ LayerIdInVps[ nuh_layer_id ] ][ i ] ] ] [
            ViewId[ the value of nuh_layer_id of
            RefPicSetLayerLeft[ j − 1 ]] < 0 ]; j−− )
            RefPicSetInterLayerLeft[ j ] =
                RefPicSetInterLayerLeft[ j − 1 ]
        RefPicSetInterLayerLeft[ j ] = the picture with picture order
            count equal to PicOrderCnt and nuh_layer_id equal to
            RefLayerId[ LayerIdInVps[ nuh_layer_id ] ][ i ]
        NumInterLayerLeft++
        RefPicSetInterLeft[ j ] is marked as "used for long-term
            reference"
    } else {
        for( j = NumInterLayerRight; j > 0 && scale(ViewId[
            RefLayerId[ LayerIdInVps[ nuh_layer_id ] ][ i ] ] ,
            ViewId[ the value of nuh_layer_id of
            RefPicSetLayerRight[ j − 1 ] ]) > 0 ; j−− )
            RefPicSetInterLayerRight[ j ] =
                RefPicSetInterLayerRight[ j − 1 ]
        RefPicSetInterLayerRight[ j ] = the picture with picture
            order count equal to PicOrderCnt and nuh_layer_id
            equal to RefLayerId[LayerIdInVps[ nuh_layer_id ]
            ][ i ]
        NumInterLayerRight++
        RefPicSetInterRight[ j ] is marked as "used for long-term
            reference"
    }
}
```

The output of the marking process for ending the decoding of a coded picture with nuh_layer_id greater than zero is a potentially updated marking as "used for short-term reference" for some decoded pictures. The following applies:

```
for( i = 0; i < NumInterLayerLeft; i++ )
    RefPicSetInterLayerLeft[ i ] is marked as "used for short-term
        reference"
for( i = 0; i < NumInterLayerRight; i++ )
    RefPicSetInterLayerRight[ i ] is marked as "used for short-term
        reference"
```

The following decoding process for reference picture lists construction is invoked at the beginning of the decoding process for each P or B slice.

When decoding a P slice, there is a single reference picture list RefPicList0. When decoding a B slice, there is a second independent reference picture list RefPicList1 in addition to RefPicList0. At the beginning of the decoding process for each slice, the reference picture list RefPicList0, and for B slices RefPicList1, are derived as follows.

The variable NumRpsCurrTempList0 is set equal to Max (num_ref_idx_l0_active_minus1+1, NumPocTotalCurr) and the list RefPicListTemp0 is constructed as follows:

```
rIdx = 0
while( rIdx < NumRpsCurrTempList0 ) {
    for( i = 0; i < NumPocStCurrBefore && rIdx <
        NumRpsCurrTempList0;
        rIdx++, i++ )
        RefPicListTemp0[ rIdx ] = RefPicSetStCurrBefore[ i ]
    for( i = 0; i < NumInterLayerLeft; rIdx++, i++ )
        RefPicListTemp0[ rIdx ] = RefPicSetInterLayerLeft[ i ]
```

-continued

```
    for( i = 0; i < NumPocStCurrAfter && rIdx <
        NumRpsCurrTempList0;
        rIdx++, i++ )
        RefPicListTemp0[ rIdx ] = RefPicSetStCurrAfter[ i ]
    for( i = 0; i < NumPocLtCurr && rIdx < NumRpsCurrTempList0;
        rIdx++, i++ )
        RefPicListTemp0[ rIdx ] = RefPicSetLtCurr[ i ]
    for( i = 0; i < NumInterLayerRight; rIdx++, i++ )
        RefPicListTemp0[ rIdx ] = RefPicSetInterLayerRight[ i ]
}
```

The list RefPicList0 is constructed as follows:

```
for( rIdx = 0; rIdx <= num_ref_idx_l0_active_minus1; rIdx++)
    RefPicList0[ rIdx ] = ref_pic_list_modification_flag_l0 ?
        RefPicListTemp0[ list_entry_l0[ rIdx ] ] : RefPicListTemp0[
        rIdx ]
```

When the slice is a B slice, the variable NumRpsCurrTempList1 is set equal to Max (num_ref_idx_l1_active_minus1+1, NumPocTotalCurr) and the list RefPicListTemp1 is constructed as follows:

```
rIdx = 0
while( rIdx < NumRpsCurrTempList1 ) {
    for( i = 0; i < NumPocStCurrAfter && rIdx <
        NumRpsCurrTempList1;
        rIdx++, i++ )
        RefPicListTemp1[ rIdx ] = RefPicSetStCurrAfter[ i ]
    for( i = 0; i < NumInterLayerRight; rIdx++, i++ )
        RefPicListTemp1[ rIdx ] = RefPicSetInterLayerRight[ i ]
    for( i = 0; i < NumPocStCurrBefore && rIdx <
        NumRpsCurrTempList1;
        rIdx++, i++ )
        RefPicListTemp1[ rIdx ] = RefPicSetStCurrBefore[ i ]
    for( i = 0; i < NumPocLtCurr && rIdx < NumRpsCurrTempList1;
        rIdx++, i++ )
        RefPicListTemp1[ rIdx ] = RefPicSetLtCurr[ i ]
    for( i = 0; i < NumInterLayerLeft; rIdx++, i++ )
        RefPicListTemp1[ rIdx ] = RefPicSetInterLayerLeft[ i ]
}
```

When the slice is a B slice, the list RefPicList1 is constructed as follows:

```
for( rIdx = 0; rIdx <= num_ref_idx_l1_active_minus1; rIdx++)
    RefPicList1[ rIdx ] = ref_pic_list_modification_flag_l1 ?
        RefPicListTemp1[ list_entry_l1[ rIdx ] ] : RefPicListTemp1[
        rIdx ]
```

The variable ScalabilityId[i][smIdx] specifying the identifier of the smIdx-th scalability dimension type of the i-th layer and the variable ViewId[layer_id_in_nuh[i]] specifying the view identifier of the i-th layer are derived as follows:

```
for (i = 0; i <= vps_max_layers_minus1; i++) {
    for( smIdx= 0, j =0; smIdx< 16; smIdx ++ )
        if( ( i != 0 ) && scalability_mask[ smIdx ] )
            ScalabilityId[ i ][ smIdx ] = dimension_id[ i ][ j++ ]
        else
            ScalabilityId[ i ][ smIdx ] = 0
    ViewId[ layer_id_in_nuh[ i ] ] = (i == 0) ? 0 :
        (ScalabilityId[ i ][ 0 ] & 1 ? −1 : 1)*
        ((ScalabilityId[ i ][ 0 ] >> 1) + 1)
```

Reference Picture List Construction Based on ViewId and Creating a Reference Picture List This embodiment relates to cases where the current layer and the reference layers differ in their respective values of ViewId. The proposed solution comprises two steps.

Step 1: Derivation of Two Lists RefPicSetInterLayerLeft and RefPicSetInterLayerRight.

Each inter-view reference picture given in the list RefLayerId[ ] is inserted either into RefPicSetInterLayerLeft or RefPicSetInterLayerRight, depending on its value of ViewId, ViewId_ref, and the value of ViewId of the current picture, ViewId_curr. If ViewId_ref<ViewId_curr, it is inserted into RefPicSetInterLayerLeft. Otherwise, it is inserted into RefPicSetInterLayerRight.

Optionally, the pictures in RefPicSetInterLayerLeft are sorted by decreasing value of their ViewId, i.e., the order of the reference pictures in RefPicSetInterLayerLeft is such that the absolute difference abs(ViewId_ref−ViewId_curr) is increasing. Further, the pictures in RefPicSetInterLayerRight are sorted by increasing value of their ViewId, i.e., the order of the reference pictures in RefPicSetInterLayerRight is such that the absolute difference abs(ViewId_ref−ViewId_curr) is increasing.

Step 2: Insertion of inter-view reference pictures into the reference picture lists RefPicListTemp0 and RefPicListTemp1.

RefPicListTemp0 and RefPicListTemp1 are the reference picture lists before applying reference picture list modification commands. For RefPicListTemp0, the pictures from RefPicSetInterLayerLeft are inserted according to their order in RefPicSetInterLayerLeft. Afterwards, pictures from RefPicSetInterLayerRight are inserted according to their order in RefPicSetInterLayerRight. For RefPicListTemp1, the pictures from RefPicSetInterLayerRight are inserted according to their order in RefPicSetInterLayerRight. Afterwards, pictures from RefPicSetInterLayerLeft are inserted according to their order in RefPicSetInterLayerLeft.

The following SPS extension syntax is proposed:

| sps_extension( ) { | Descriptor |
|---|---|
| inter_view_mv_vert_constraint_flag | u(1) |
| inter_view_ref_picture_list_right_first | u(1) |
| } | |

Here, inter_view_ref_picture_list_right_first_flag equal to 1 sets the variable interViewRefPictureListRightFirst equal to 1. Otherwise, the variable interViewRefPictureListRightFirst is equal to 0. The variable interViewRefPictureListRightFirst swaps the positions in which the lists RefPicSetInterLayerLeft and RefPicSetInterLayerRight are inserted into NumRpsCurrTempList0 and NumRpsCurrTempList1.

Alternatively, the flag inter_view_ref_picture_list_right_first_flag can be signaled in a slice header or in a PPS. Additionally, a flag may be signaled in order to specify whether inter_view_ref_picture_list_right_first_flag is signaled on a slice level or on the SPS level.

The following alternative SPS extension syntax is proposed:

| sps_extension( ) { | Descriptor |
|---|---|
| inter_view_mv_vert_constraint_flag | u(1) |
| inter_view_ref_picture_list_right_first_flag | u(1) |
| } | |

Correspondingly, the following slice segment syntax is proposed:

| | Descriptor |
|---|---|
| inter_view_ref_picture_list_right_first_flag_in_slice_header | u(1) |
| if (!inter_view_ref_picture_list_right_first_flag_in_slice_header) | u(1) |
|    inter_view_ref_picture_list_right_first_slice_flag | |

If the flag inter_view_ref_picture_list_right_first_slice_flag is signaled on a slice level, the value of the flag in a slice header overwrites the value of the flag in an SPS.

The output of the decoding process for inter-layer reference picture sets is two updated lists of inter-layer pictures, RefPicSetInterLayerLeft and RefPicSetInterLayerRight, and the variables NumInterLayerBefore and NumInterLayerAfter.

The lists RefPicSetInterLayerLeft and RefPicSetInterLayerLeft are first emptied and then derived as follows:

```
for( i = 0, NumInterLayerLeft = 0, NumInterLayerAfter = 0; i <
    NumDirectRefLayers[ LayerIdInVps[ nuh_layer_id ] ]; i++ )
  if( ViewId[ RefLayerId[ LayerIdInVps[ nuh_layer_id ] ][ i ] ] <
      ViewId[ nuh_layer_id ] ) {
    for( j = NumInterLayerLeft; j > 0 && ViewId[ RefLayerId[
        LayerIdInVps[ nuh_layer_id ] ][ i ] ] >
        ViewId[ the value of nuh_layer_id of
        RefPicSetLayerLeft[ j − 1 ] ]; j−− )
      RefPicSetInterLayerLeft[ j ] =
        RefPicSetInterLayerLeft[ j − 1 ]
    RefPicSetInterLayerLeft[ j ] = the picture with picture order
        count equal to PicOrderCnt and nuh_layer_id equal to
        RefLayerId[ LayerIdInVps[ nuh_layer_id ] ] [ i ]
    NumInterLayerLeft++
    RefPicSetInterLeft[ j ] is marked as "used for long-term
        reference"
  } else {
    for( j = NumInterLayerRight; j > 0 && ViewId[ RefLayerId[
        LayerIdInVps[ nuh_layer_id ] ][ i ] ] <
        ViewId[ the value of nuh_layer_id of
        RefPicSetLayerAfter[ j − 1 ] ]; j−− )
      RefPicSetInterLayerRight [ j ] =
        RefPicSetInterLayerRight[ j − 1 ]
    RefPicSetInterLayerRight[ j ] = the picture with picture order
        count equal to PicOrderCnt and nuh_layer_id equal to
        RefLayerId[ LayerIdInVps[ nuh_layer_id ] ] [ i ]
    NumInterLayerRight++
    RefPicSetInterRight [ j ] is marked as "used for long-term
        reference"
  }
```

The output of the marking process for ending the decoding of a coded picture with nuh_layer_id greater than 0 is a potentially updated marking as "used for short-term reference" for some decoded pictures. The following applies:

```
for( i = 0; i < NumInterLayerBefore; i++ )
  RefPicSetInterLayerLeft[ i ] is marked as "used for short-term
      reference"
for( i = 0; i < NumInterLayerAfter; i++ )
  RefPicSetInterLayerRight[ i ] is marked as "used for short-term
      reference"
```

The following decoding process for reference picture lists construction is invoked at the beginning of the decoding process for each P or B slice.

When decoding a P slice, there is a single reference picture list RefPicList0. When decoding a B slice, there is a second independent reference picture list RefPicList1 in addition to RefPicList0.

At the beginning of the decoding process for each slice, the reference picture list RefPicList0, and for B slices RefPicList1, are derived as follows.

The variable NumRpsCurrTempList0 is set equal to Max (num_ref_idx_l0_active_minus1+1, NumPocTotalCurr) and the list RefPicListTemp0 is constructed as follows:

```
rIdx = 0
while( rIdx < NumRpsCurrTempList0 ) {
    for( i = 0; i < NumPocStCurrBefore && rIdx <
    NumRpsCurrTempList0;
        rIdx++, i++ )
        RefPicListTemp0[ rIdx ] = RefPicSetStCurrBefore[ i ]
    if (!interViewRefPictureListRightFirst)
        for( i = 0; i < NumInterLayerLeft; rIdx++, i++ )
            RefPicListTemp0[ rIdx ] = RefPicSetInterLayerLeft[ i ]
    else
        for( i = 0; i < NumInterLayerRight; rIdx++, i++ )
            RefPicListTemp0[ rIdx ] = RefPicSetInterLayerRight[ i ]
    for( i = 0; i < NumPocStCurrAfter && rIdx <
    NumRpsCurrTempList0;
        rIdx++, i++ )
        RefPicListTemp0[ rIdx ] = RefPicSetStCurrAfter[ i ]
    for( i = 0; i < NumPocLtCurr && rIdx < NumRpsCurrTempList0;
        rIdx++, i++ )
        RefPicListTemp0[ rIdx ] = RefPicSetLtCurr[ i ]
    if (!interViewRefPictureListRightFirst)
        for( i = 0; i < NumInterLayerRight; rIdx++, i++ )
            RefPicListTemp0[ rIdx ] = RefPicSetInterLayerRight[ i ]
    else
        for( i = 0; i < NumInterLayerLeft; rIdx++, i++ )
            RefPicListTemp0[ rIdx ] = RefPicSetInterLayerLeft[ i ]
}
```

The list RefPicList0 is constructed as follows:

```
for( rIdx = 0; rIdx <= num_ref_idx_l0_active_minus1; rIdx++)
    RefPicList0[ rIdx ] = ref_pic_list_modification_flag_l0 ?
        RefPicListTemp0[ list_entry_l0[ rIdx ] ] : RefPicListTemp0[
        rIdx ]
```

When the slice is a B slice, the variable NumRpsCurrTempList1 is set equal to Max (num_ref_idx_l1_active_minus1+1, NumPocTotalCurr) and the list RefPicListTemp1 is constructed as follows:

```
rIdx = 0
while( rIdx < NumRpsCurrTempList1 ) {
    for( i = 0; i < NumPocStCurrAfter && rIdx <
    NumRpsCurrTempList1;
        rIdx++, i++ )
        RefPicListTemp1[ rIdx ] = RefPicSetStCurrAfter[ i ]
    if (!interViewRefPictureListRightFirst)
        for( i = 0; i < NumInterLayerRight; rIdx++, i++ )
            RefPicListTemp1[ rIdx ] = RefPicSetInterLayerRight[ i ]
    else
        for( i = 0; i < NumInterLayerLeft; rIdx++, i++ )
            RefPicListTemp1[ rIdx ] = RefPicSetInterLayerLeft[ i ]
    for( i = 0; i < NumPocStCurrBefore && rIdx <
    NumRpsCurrTempList1;
        rIdx++, i++ )
        RefPicListTemp1[ rIdx ] = RefPicSetStCurrBefore[ i ]
    for( i = 0; i < NumPocLtCurr && rIdx < NumRpsCurrTempList1;
        rIdx++, i++ )
        RefPicListTemp1[ rIdx ] = RefPicSetLtCurr[ i ]
    if (!interViewRefPictureListRightFirst)
        for( i = 0; i < NumInterLayerLeft; rIdx++, i++ )
            RefPicListTemp1[ rIdx ] = RefPicSetInterLayerLeft[ i ]
    else
        for( i = 0; i < NumInterLayerRight; rIdx++, i++ )
            RefPicListTemp1[ rIdx ] = RefPicSetInterLayerRight[ i ]
}
```

When the slice is a B slice, the list RefPicList1 is constructed as follows:

```
for( rIdx = 0; rIdx <= num_ref_idx_l1_active_minus1; rIdx++)
    RefPicList1[ rIdx ] = ref_pic_list_modification_flag_l1 ?
        RefPicListTemp1[ list_entry_l1[ rIdx ] ] : RefPicListTemp1[
        rIdx ]
```

Alternatively, pictures from the list RefPicSetLtCurr may be placed at the last position when constructing the lists RefPicListTemp0 and RefPicListTemp1.

Positioning of Reference Picture Sets in the Reference Picture List Construction This embodiment relates to cases where the current layer and the reference layers differ in their respective values of ViewId. The proposed solution comprises two steps.

Step 1: Derivation of Two Lists RefPicSetInterLayerLeft and RefPicSetInterLayerRight or, alternatively, RefPicSetInterLayerBefore and RefPicSetInterLayerAfter.

Each inter-view reference picture given in the list RefLayerId[ ] is inserted either into RefPicSetInterLayerLeft or RefPicSetInterLayerRight, depending on its value of ViewId, ViewId_ref, and the value of ViewId of the current picture, ViewId_curr. If ViewId_ref<ViewId_curr, it is inserted into RefPicSetInterLayerLeft. Otherwise, it is inserted into RefPicSetInterLayerRight. The pictures in RefPicSetInterLayerLeft are sorted by decreasing value of their ViewId, i.e., the order of the reference pictures in RefPicSetInterLayerLeft is such that the absolute difference abs(ViewId_ref−ViewId_curr) is increasing. The pictures in RefPicSetInterLayerRight are sorted by increasing value of their ViewId, i.e., the order of the reference pictures in RefPicSetInterLayerRight is such that the absolute difference abs(ViewId_ref−ViewId_curr) is increasing.

Step 2: Insertion of Inter-View Reference Pictures into the Reference Picture Lists RefPicListTemp0 and RefPicListTemp1.

RefPicListTemp0 and RefPicListTemp1 are the reference picture lists before applying reference picture list modification commands. For RefPicListTemp0, the pictures from RefPicSetInterLayerLeft are inserted according to their order in RefPicSetInterLayerLeft. Afterwards, pictures from RefPicSetInterLayerRight are inserted according to their order in RefPicSetInterLayerRight. For RefPicListTemp1, the pictures from RefPicSetInterLayerRight are inserted according to their order in RefPicSetInterLayerRight. Afterwards, pictures from RefPicSetInterLayerLeft are inserted according to their order in RefPicSetInterLayerLeft.

The following SPS extension syntax is proposed:

| sps_extension( ) { | Descriptor |
|---|---|
| inter_layers_pos_flag | u(1) |
| if (inter_layers_pos_flag) { | |
| ref_pic_set_inter_layer_left_pos | u(v) |
| ref_pic_set_inter_layer_right_pos | u(v) |
| } | |
| } | |

Alternatively, the position information is sent in the slice header, using the following syntax:

| slice_segment_header( ) { | Descriptor |
|---|---|
| inter_layers_pos_flag | u(1) |
| if (inter_layers_pos_flag) { | |
| ref_pic_set_inter_layer_left_pos | u(v) |
| ref_pic_set_inter_layer_right_pos | u(v) |
| } | |
| } | |

The flag ref_pic_set_inter_layer_left_pos specifies the position for inserting the left inter layer reference picture set into the RefPicListTemp0 and RefPicListTemp1. The flag ref_pic_set_inter_layer_right_pos specifies the position for inserting the right inter layer reference picture set into the RefPicListTemp0 and RefPicListTemp1. The flags specify the position in terms of the reference picture sets. Alternatively, the flags may specify the position in terms of the reference pictures.

The output of the decoding process for inter-layer reference picture sets is two updated lists of inter-layer pictures, RefPicSetInterLayerLeft and RefPicSetInterLayerRight, and the variables NumInterLayerLeft and NumInterLayerRight. This process is similar to corresponding processes describe for other embodiments.

The output of the following marking process for ending the decoding of a coded picture with nuh_layer_id greater than 0 is a potentially updated marking as "used for short-term reference" for some decoded pictures. The following applies:

```
for( i = 0; i < NumInterLayerLeft; i++ )
    RefPicSetInterLayerLeft[ i ] is marked as "used for short-term
        reference"
for( i = 0; i < NumInterLayerRight; i++ )
    RefPicSetInterLayerRight[ i ] is marked as "used for short-term
        reference"
```

The decoding process for reference picture lists construction is invoked at the beginning of the decoding process for each P or B slice.

When decoding a P slice, there is a single reference picture list RefPicList0. When decoding a B slice, there is a second independent reference picture list RefPicList1 in addition to RefPicList0.

At the beginning of the decoding process for each slice, the reference picture list RefPicList0, and for B slices RefPicList1, are derived as follows.
The variable NumRpsCurrTempList0 is set equal to Max (num_ref_idx_l0_active_minus1+1, NumPocTotalCurr) and the list RefPicListTemp0 is constructed as follows:

```
insertInterLayerLeftSet ( ){
    for( i = 0; i < NumInterLayerLeft; rIdx++, i++ )
        RefPicListTemp0[ rIdx ] = RefPicSetInterLayerLeft[ i ]
}
insertInterLayerRightSet ( ){
    for( i = 0; i < NumInterLayerRight; rIdx++, i++ )
        RefPicListTemp0[ rIdx ] = RefPicSetInterLayerRight[ i ]
}
rIdx = 0
refPicSetPos = 1
while( rIdx < NumRpsCurrTempList0 ) {
    if (refPicSetInterLayerLeftPos == refPicSetPos) {
        insertInterLayerLeftSet ( );
        refPicSetPos = refPicSetPos +1 ;
    }
```

-continued

```
    if (refPicSetInterLayerRightPos == refPicSetPos) {
        insertInterLayerRightSet ( );
        refPicSetPos = refPicSetPos +1 ;
    }
    for( i = 0; i < NumPocStCurrBefore && rIdx <
NumRpsCurrTempList0;
        rIdx++, i++ )
        RefPicListTemp0[ rIdx ] = RefPicSetStCurrBefore[ i ]
    refPicSetPos = refPicSetPos +1 ;
    if (refPicSetInterLayerLeftPos == refPicSetPos) {
        insertInterLayerLeftSet ( );
        refPicSetPos = refPicSetPos +1 ;
    }
    if (refPicSetInterLayerRightPos == refPicSetPos) {
        insertInterLayerRightSet ( );
        refPicSetPos = refPicSetPos +1 ;
    }
    for( i = 0; i < NumPocStCurrAfter && rIdx <
NumRpsCurrTempList0;
        rIdx++, i++ )
        RefPicListTemp0[ rIdx ] = RefPicSetStCurrAfter[ i ]
    refPicSetPos = refPicSetPos +1 ;
    if (refPicSetInterLayerLeftPos == refPicSetPos) {
        insertInterLayerLeftSet ( );
        refPicSetPos = refPicSetPos +1 ;
    }
    if (refPicSetInterLayerRightPos == refPicSetPos) {
        insertInterLayerRightSet ( );
        refPicSetPos = refPicSetPos +1 ;
    }
    for( i = 0; i < NumPocLtCurr && rIdx < NumRpsCurrTempList0;
        rIdx++, i++ )
        RefPicListTemp0[ rIdx ] = RefPicSetLtCurr[ i ]
    refPicSetPos = refPicSetPos +1 ;
    if (refPicSetInterLayerLeftPos == refPicSetPos) {
        insertInterLayerLeftSet ( );
        refPicSetPos = refPicSetPos +1 ;
    }
    if (refPicSetInterLayerRightPos == refPicSetPos) {
        insertInterLayerRightSet ( );
        refPicSetPos = refPicSetPos +1 ;
    }
}
```

The list RefPicList0 is constructed as follows:

```
for( rIdx = 0; rIdx <= num_ref_idx_l0_active_minus1; rIdx++)
    RefPicList0[ rIdx ] = ref_pic_list_modification_flag_l0 ?
    RefPicListTemp0[ list_entry_l0[ rIdx ] ] : RefPicListTemp0[ rIdx ]
```

When the slice is a B slice, the variable NumRpsCurrTempList1 is set equal to Max (num_ref_idx_l1_active_minus1+1, NumPocTotalCurr) and the list RefPicListTemp1 is constructed as follows:

```
rIdx = 0
while( rIdx < NumRpsCurrTempList1 ) {
    if (refPicSetInterLayerLeftPos == refPicSetPos) {
        insertInterLayerLeftSet ( );
        refPicSetPos = refPicSetPos +1 ;
    }
    if (refPicSetInterLayerRightPos == refPicSetPos) {
        insertInterLayerRightSet ( );
        refPicSetPos = refPicSetPos +1 ;
    }
    for( i = 0; i < NumPocStCurrAfter && rIdx <
NumRpsCurrTempList1;
        rIdx++, i++ )
        RefPicListTemp1[ rIdx ] = RefPicSetStCurrAfter[ i ]
    refPicSetPos = refPicSetPos +1 ;
    if (refPicSetInterLayerLeftPos == refPicSetPos) {
        insertInterLayerLeftSet ( );
        refPicSetPos = refPicSetPos +1 ;
    }
```

-continued

```
    if (refPicSetInterLayerRightPos == refPicSetPos) {
        insertInterLayerRightSet ( );
        refPicSetPos = refPicSetPos +1 ;
    }
    for( i = 0; i < NumPocStCurrBefore && rIdx <
NumRpsCurrTempList1;
        rIdx++, i++ )
        RefPicListTemp1[ rIdx ] = RefPicSetStCurrBefore[ i ]
    refPicSetPos = refPicSetPos +1 ;
    if (refPicSetInterLayerLeftPos == refPicSetPos) {
        insertInterLayerLeftSet ( );
        refPicSetPos = refPicSetPos +1 ;
    }
    if (refPicSetInterLayerRightPos == refPicSetPos) {
        insertInterLayerRightSet ( );
        refPicSetPos = refPicSetPos +1 ;
    }
    for( i = 0; i < NumPocLtCurr && rIdx < NumRpsCurrTempList1;
        rIdx++, i++ )
        RefPicListTemp1[ rIdx ] = RefPicSetLtCurr[ i ]
    refPicSetPos = refPicSetPos +1 ;
    if (refPicSetInterLayerLeftPos == refPicSetPos) {
        insertInterLayerLeftSet ( );
        refPicSetPos = refPicSetPos +1 ;
    }
    if (refPicSetInterLayerRightPos == refPicSetPos) {
        insertInterLayerRightSet ( );
        refPicSetPos = refPicSetPos +1 ;
    }
}
```

When the slice is a B slice, the list RefPicList1 is constructed as follows:

```
for( rIdx = 0; rIdx <= num_ref_idx_l1_active_minus1; rIdx++)
    RefPicList1[ rIdx ] = ref_pic_list_modification_flag_l1 ?
        RefPicListTemp1[ list_entry_l1[ rIdx ] ] : RefPicListTemp1[
        rIdx ]
```

Alternatively, pictures from the list RefPicSetLtCurr may be placed at the last position when constructing the lists RefPicListTemp0 and RefPicListTemp1.

The invention is further elucidated by means of the following non-limiting examples.

Example 1

The scalability identifier DependencyId may correspond to a spatial resolution, where a higher value of DependencyId corresponds to higher spatial resolution. For instance, if the current layer has DependencyId=3, and the reference pictures have DependencyId=0, DependencyId=1, and DependencyId=2, then the layer with DependencyId=2 is likely most similar to the current layer and prediction is thus likely to work well. Further, the layer with DependencyId=1 is likely second most similar to the current layer, and the layer with DependencyId=0 is likely least similar to the current layer.

Thus, the inter-layer reference pictures are inserted in the order dependencyId=2, DependencyId=1, DependencyId=0, i.e., in the order of the respective difference of their value of DependencyId and the value of DependencyId for the current picture.

Example 2

The scalability identifier QualityId may correspond to a quality level (e.g., quantizer step size), where a higher value of QualityId corresponds to higher signal fidelity. For instance, if the current layer has QualityId=3, and the reference pictures have QualityId=0, QualityId=1, and QualityId=2, then the layer with QualityId=2 is likely most similar to the current layer and prediction is thus likely to work well. Further, the layer with QualityId=1 is likely second most similar to the current layer, and the layer with QualityId=0 is likely least similar to the current layer.

Thus, the inter-layer reference pictures are inserted in the order QualityId=2, QualityId=1, QualityId=0, i.e., in the order of the respective difference of their value of QualityId and the value of QualityId for the current picture.

Example 3

The scalability identifier DependencyId may correspond to a spatial resolution, and the scalability identifier QualityId may correspond to a quality level (e.g., quantizer step size), where a higher value of DependencyId corresponds to higher spatial resolution, and a higher value of QualityId corresponds to higher signal fidelity. For instance, if the current layer has DependencyId=1 and QualityId=0, and the reference layers have DependencyId=0/QualityId=0, DependencyId=0/QualityId=1 and DependencyId=0/QualityId=2, respectively, then the layer with dependencyId=0/QualityId=2 is likely most similar to the current layer and the inter-layer reference pictures are inserted in the order DependencyId=0/QualityId=2, DependencyId=0/QualityId=1, DependencyId=0/QualityId=0, i.e., starting with the highest value of QualityId and then in decreasing order of its value.

Example 4

The scalability identifier ViewId may correspond to a view identifier, where the view identifier indicates a spatial camera position. Views with similar camera positions are likely similar. Thus, inter-layer reference pictures can be inserted according to the difference of their value of ViewId and the value of ViewId for the current picture. In a particular case, when the current slice is a B slice which has two reference picture lists, list0 may contain reference pictures that have ViewId smaller than the ViewId of the current picture, and list1 may contain reference pictures that have ViewId larger than the ViewId of the current picture (or vice versa), and the lists may be ordered according to their distance, i.e., difference of layer identifiers, from the current view. For example, if the current picture has ViewId=2, and the reference pictures have ViewId=0, ViewId=1, ViewId=3, viewId=4, then list0 may contain two reference pictures in the order ViewId=1, ViewId=0, and list1 may contain two reference pictures in the order ViewId=3, ViewId=4. If more reference pictures can be inserted, list0 may contain ViewId=1, ViewId=0, ViewId=3, ViewId=4, and list1 may contain ViewId=3, ViewId=4, ViewId=1, ViewId=0.

According to an embodiment of the invention, wherein the selection and ordering is performed based on the value of a view identifier ViewId, the value of ViewId is defined to be equal to 0 for the layer with layer_id equal to 0, and the value of ViewId of a layer with layer_id greater than 0 is signaled in a binary format, in which one bit represents a sign, and one or more bits represent a magnitude.

According to an embodiment of the invention, the value of ViewId for the layer with layer_id equal to 0 is signaled explicitly.

Example 5

The parameters related to a camera positions are used in order to sort the reference pictures in the list. For example, a scale parameter, as defined in the draft 3D-HEVC specification, may be used for this purpose. Alternatively, other parameters derived from the relative positions of the cameras, e.g., a baseline parameter, may be used in order to sort the reference pictures in the list. The list is then created in the order of increasing, or decreasing, distance of the camera positions, which corresponds to a difference of the reference picture from the current picture in terms of layer identifiers, i.e., a difference between layer identifiers.

Example 6

Parameters derived from the relative positions of the cameras may also be used in order to create two reference lists, e.g., called "reference inter-view list before" and "reference inter-view list after", or, alternatively, called "reference inter-view picture list left" and "reference inter-view picture list right". These reference picture lists are ordered in the order of increasing distance between the camera positions corresponding to the reference pictures and the camera position corresponding to the current picture. In this case, one list may include the pictures which correspond to the camera positions which are located on one side of the camera position corresponding to the picture. Correspondingly, the second list may include the pictures having locations which are on the other side of the camera position corresponding to the current picture.

Example 7

Parameters derived from the relative positions of the cameras may also be used in order to create two reference lists, e.g., called "reference inter-view list before" and "reference inter-view list after", or, alternatively, called "reference inter-view picture list left" and "reference inter-view picture list right". These two lists may be used separately when creating the final reference picture list. For example, positions for inserting the reference picture list right and reference picture list left into a final reference picture list can be specified by default or can be signaled in the bitstream.

The final reference picture list may further include, e.g., one or more lists of short-term reference pictures and one or more lists of long-term reference pictures, and the positions for inserting the reference picture list right and reference picture list left into the final reference picture list may be relative to the positions where the one or more lists of short-term reference pictures and one or more lists of long-term reference pictures are inserted.

Example 8

A flag can be signaled in order to "swap" the "interview reference picture list left" and the "interview reference picture list right". Here, swapping means that the reference pictures which were included in the "interview reference picture list left" will be removed from the "interview reference picture list left" and included into the "interview reference picture list right", if the flag value has been set to "true" (or 1). In the same manner, pictures from the "interview reference picture list right" will be removed from the "interview reference picture list right" and included into the "interview reference picture list left". The flag can be signaled in the SPS, PPS, a slice header (or slice segment header), or in another parameter set which is part of the bitstream.

Alternatively, an implicit criterion can be used in order to determine whether the pictures from the "interview reference picture list right" should be swapped with the pictures in the "interview reference picture list left".

Example 9

In Examples 4, 6, and 7, the exact positions for the resulting reference picture sets in the resulting preliminary reference picture list may be signaled explicitly in order to improve the coding efficiency. The present example may be considered as an extension of Example 8 with the difference that the exact position for the first reference picture set and the second reference picture set is sent to the decoder. The position may be signaled in the form of the reference picture position in the list as well as the reference picture set position in terms of the reference picture sets.

Figure 2:
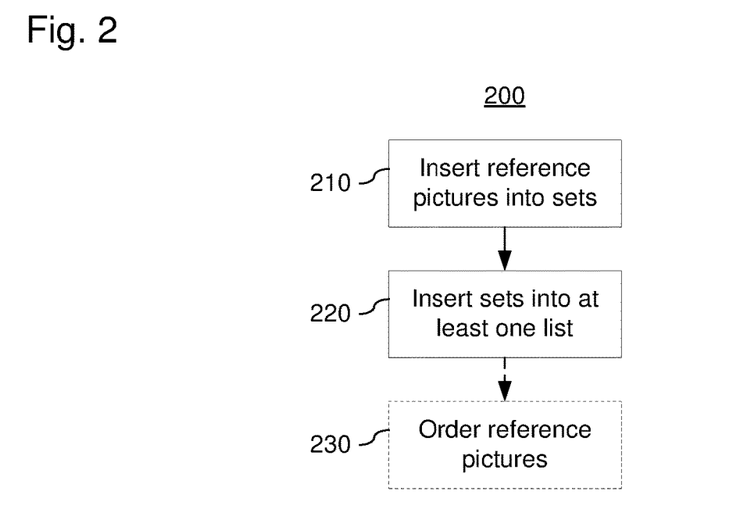
FIG. 2 shows a method of constructing lists of reference pictures, in accordance with an embodiment of the invention.

With reference to FIG. 2, an embodiment 200 of the method of constructing at least one list of reference pictures for inter-layer prediction of a current picture is described. Method 200 comprises inserting 210 reference pictures into a first set of reference pictures or a second set of reference pictures, based on respective values of a scalability identifier associated with the reference pictures and a value of the scalability identifier associated with the current picture, and inserting 220 the first set of reference pictures and the second set of reference pictures into the at least one list of reference pictures. Method 200 may further comprise ordering 230 the reference pictures comprised in the first set of reference pictures and the second set of reference pictures according to their respective values of the scalability identifier. Optionally, method 200 may further comprise steps described hereinbefore.

Figure 3:
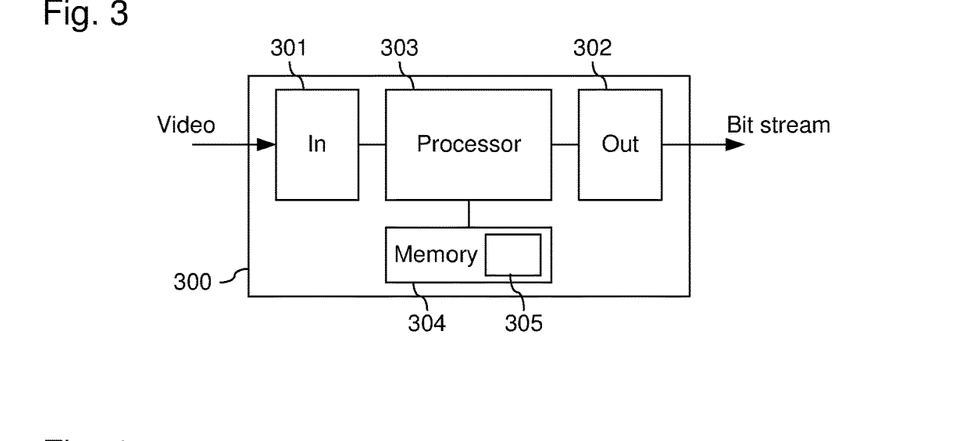
FIG. 3 shows a video encoder, in accordance with an embodiment of the invention.

In FIG. 3, an embodiment 300 of an encoder is illustrated. Encoder 300 comprises at least an input section 301, an output section 302, a processor 303, and a memory 304.

Encoder 300 is arranged for receiving a video, i.e., a sequence of pictures, via input section 301, and processor 303 is configured to perform the procedures described hereinabove. In addition, processor 303 may be configured for performing other procedures related to video coding which are known in the art. Output section 302 may be arranged for providing the bitstream for further processing or transport over a communications network.

The functionality of the processor may be realized by a computer program 305, i.e., software, stored in memory 304. Computer program 305 comprises computer-executable instructions which are adapted, when executed on processor 303, to implement the procedures described hereinabove.

Figure 6:
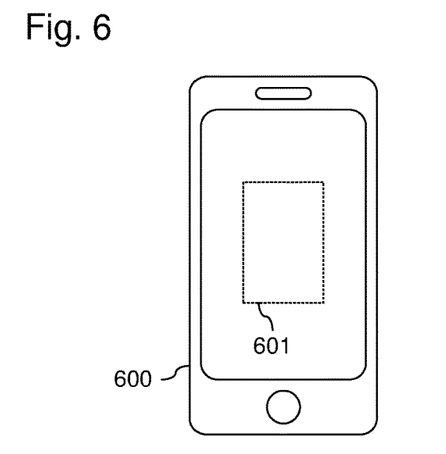
FIG. 6 shows a mobile terminal, in accordance with an embodiment of the invention.

An embodiment of encoder 300 may be provided as part 601 of a mobile terminal 600 (illustrated in FIG. 6), a tablet, a computer, or the like.

Figure 4:
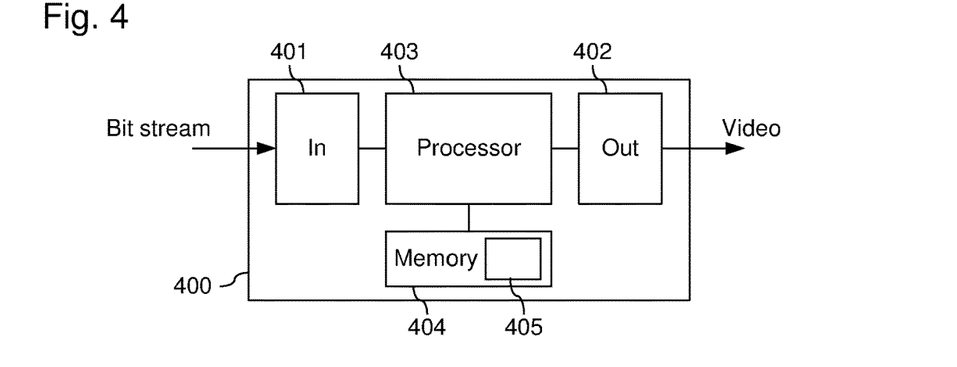
FIG. 4 shows a video decoder, in accordance with an embodiment of the invention.

In FIG. 4, an embodiment 400 of a decoder is illustrated. Decoder 400 comprises at least an input section 401, an output section 402, a processor 403, and a memory 404.

Decoder 400 is arranged for receiving a bitstream via input section 401, and processor 403 is configured to perform the procedures described hereinabove. In addition, processor 403 may be configured for performing other procedures related to video coding which are known in the art. Output section 402 may be arranged for providing the video for further processing, e.g., displaying. The functionality of processor 403 may be realized by a computer program 405, i.e., software, stored in memory 404. Computer program 405 comprises computer-executable instructions which are adapted, when executed on processor 403, to implement the procedures described hereinabove.

An embodiment of decoder 400 may be provided as part 601 of a mobile terminal 600 (illustrated in FIG. 6), a tablet, a computer, or the like.

An embodiment of the decoder 400 may receive the bitstream from an embodiment of the encoder 300 via a communications network, such as the Internet, a cellular network, a radio network, or the like, or a combination thereof.

Figure 5:
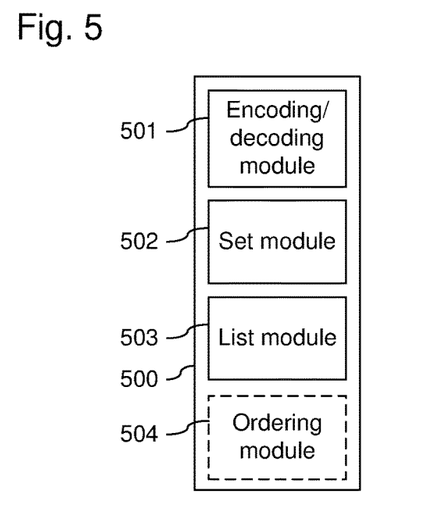
FIG. 5 shows a video encoder or decoder, in accordance with another embodiment of the invention.

In FIG. 5, an alternative embodiment 500 of a video encoder (decoder) is illustrated. Video encoder (decoder) 500 comprises input and output sections, as described with reference to FIGS. 3 and 4 (not shown in FIG. 5), an encoding (decoding) module 501, a set module 502, a list module 503, and, optionally, an ordering module 504. Set module 502 and list module 503 are configured to operate in accordance with what is described hereinbefore. In particular, set module 502 is configured for inserting reference pictures into a first set of reference pictures or a second set of reference pictures based on respective values of a scalability identifier associated with the reference pictures and a value of the scalability identifier associated with the current picture. Further, list module 503 is configured for inserting the first set of reference pictures and the second set of reference pictures into the at least one list of reference pictures.

If present, ordering module 503 is configured to operate in accordance with what is described hereinbefore, in particular ordering the reference pictures comprised in the first set of reference pictures and the second set of reference pictures according to their respective values of the scalability identifier.

An embodiment of encoder (decoder) 500 may be provided as part 601 of a mobile terminal 600 (illustrated in FIG. 6), a tablet, a computer, or the like.

The person skilled in the art realizes that the invention by no means is limited to the embodiments described above. On the contrary, many modifications and variations are possible within the scope of the appended claims.

The invention claimed is:

1. A method of constructing at least one list of reference pictures for inter-layer prediction of a current picture, the method comprising:
inserting each of a plurality of reference pictures into a respective one of a first set of reference pictures and a second set of reference pictures, wherein said inserting comprises assigning the reference pictures to the first and second sets of reference pictures based on respective values of scalability identifiers associated with the reference pictures and a value of the scalability identifier associated with the current picture; and
inserting the first set of reference pictures and the second set of reference pictures into the at least one list of reference pictures;
wherein each of the scalability identifiers is a view identifier indicating a relative spatial camera capture position.

2. The method of claim 1, wherein the reference pictures are inserted into the first set of reference pictures or the second set of reference pictures based on a difference of their respective value of the scalability identifier and the value of the scalability identifier associated with the current picture.

3. The method of claim 2, wherein reference pictures having respective values of the scalability identifier which are smaller than the value of the scalability identifier associated with the current picture are inserted into the first set of reference pictures, and reference pictures having respective values of the scalability identifier which are greater than the value of the scalability identifier associated with the current picture are inserted into the second set of reference pictures.

4. The method of claim 1, further comprising ordering the reference pictures comprised in the first set of reference pictures and the second set of reference pictures according to their respective values of the scalability identifier.

5. The method of claim 4, wherein the reference pictures are ordered in decreasing value of the scalability identifier.

6. The method of claim 4, wherein the reference pictures are ordered in increasing value of the scalability identifier.

7. The method of claim 4, wherein the reference pictures are ordered in decreasing absolute difference of their respective values of the scalability identifier and the value of the scalability identifier associated with the current picture.

8. The method of claim 4, wherein the reference picture are ordered in increasing absolute difference of their respective values of the scalability identifier and the value of the scalability identifier associated with the current picture.

9. The method of claim 1, wherein two lists of reference pictures are constructed, the first set of reference pictures is inserted into the first list of reference pictures in front of the second set of reference pictures, and the second set of reference pictures is inserted into the second list of reference pictures in front of the first set of reference pictures.

10. The method of claim 9, wherein:
the first set of reference pictures is inserted into the first list of reference pictures after a first set of short-term reference pictures;
the first set of reference pictures is inserted at the end of the second list of reference pictures;
the second set of reference pictures is inserted into the second list of reference pictures after the second set of short-term reference pictures and before the first set of short-term reference pictures; and
the second set of reference pictures is inserted at the end of the first list of reference pictures.

11. The method of claim 1, wherein the reference pictures are inserted into the first set of reference pictures and the second set of reference pictures based on their respective values of at least two scalability identifiers, a first and a second scalability identifier, associated with the reference pictures and respective values of the scalability identifiers associated with the current picture.

12. The method of claim 1, wherein the method is implemented as part of a video encoding process.

13. The method of claim 1, wherein the method is implemented as part of a video decoding process.

14. A non-transitory computer-readable comprising, stored thereupon, computer-executable instructions configured to cause a device to perform the method of claim 1 when the computer-executable instructions are executed on a processing unit comprised in the device.

15. A device for constructing at least one list of reference pictures for inter-layer prediction of a current picture, the device comprising a processing circuit configured to:
insert each of a plurality of reference pictures into a respective one of a first set of reference pictures and a second set of reference pictures, such that said inserting comprises assigning the reference pictures to the first and second sets of reference pictures based on respective values of scalability identifiers associated with the reference pictures and a value of the scalability identifier associated with the current picture; and
insert the first set of reference pictures and the second set of reference pictures into the at least one list of reference pictures;

wherein each of the scalability identifiers is a view identifier indicating a relative spatial camera capture position.

16. The device of claim 15, the processing circuit being configured to insert the reference pictures into the first set of reference pictures or the second set of reference pictures based on a difference of their respective value of the scalability identifier and the value of the scalability identifier associated with the current picture.

17. The device of claim 16, the processing circuit being configured to insert reference pictures having respective values of the scalability identifier which are smaller than the value of the scalability identifier associated with the current picture are into the first set of reference pictures, and insert reference pictures having respective values of the scalability identifier which are greater than the value of the scalability identifier associated with the current picture are into the second set of reference pictures.

18. The device of claim 15, the processing circuit being further configured to order the reference pictures comprised in the first set of reference pictures and the second set of reference pictures according to their respective values of the scalability identifier.

19. The device of claim 18, the processing circuit being configured to order the reference pictures in decreasing value of the scalability identifier.

20. The device of claim 18, the processing circuit being configured to order the reference pictures in increasing value of the scalability identifier.

21. The device of claim 18, the processing circuit being configured to order the reference pictures in decreasing absolute difference of their respective values of the scalability identifier and the value of the scalability identifier associated with the current picture.

22. The device of claim 18, the processing circuit being configured to order the reference pictures in increasing absolute difference of their respective values of the scalability identifier and the value of the scalability identifier associated with the current picture.

23. The device of claim 15, the processing circuit being configured to construct two lists of reference pictures, insert the first set of reference pictures into the first list of reference pictures in front of the second set of reference pictures, and insert the second set of reference pictures into the second list of reference pictures in front of the first set of reference pictures.

24. The device of claim 15, the processing circuit being configured to insert the reference pictures into the first set of reference pictures or the second set of reference pictures based on their respective values of at least two scalability identifiers, a first and a second scalability identifier, associated with the reference pictures and respective values of the scalability identifiers associated with the current picture.

25. The device of claim 15, the device being a video encoder.

26. The device of claim 15, the device being a video decoder.

27. A mobile terminal comprising the device of claim 15.

* * * * *